Aug. 7, 1956 P. E. KUNKEL 2,757,953
BALE GRAPPLE
Filed Dec. 23, 1953 2 Sheets-Sheet 1
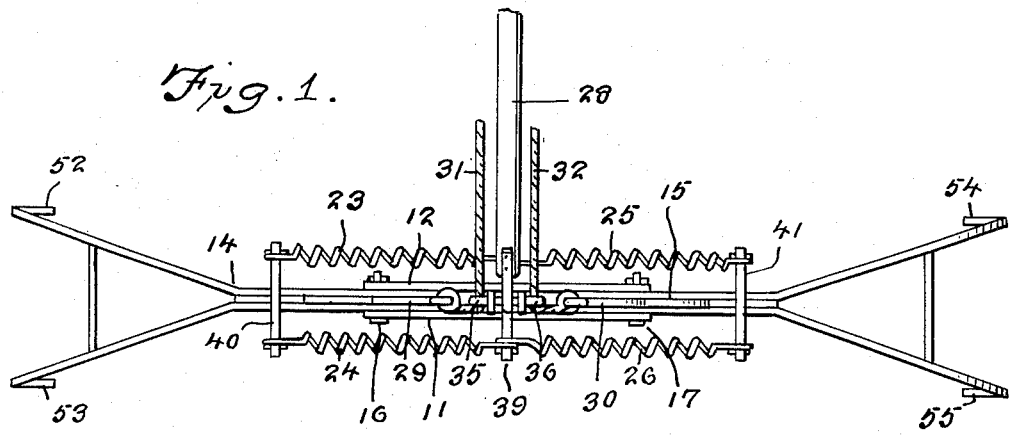
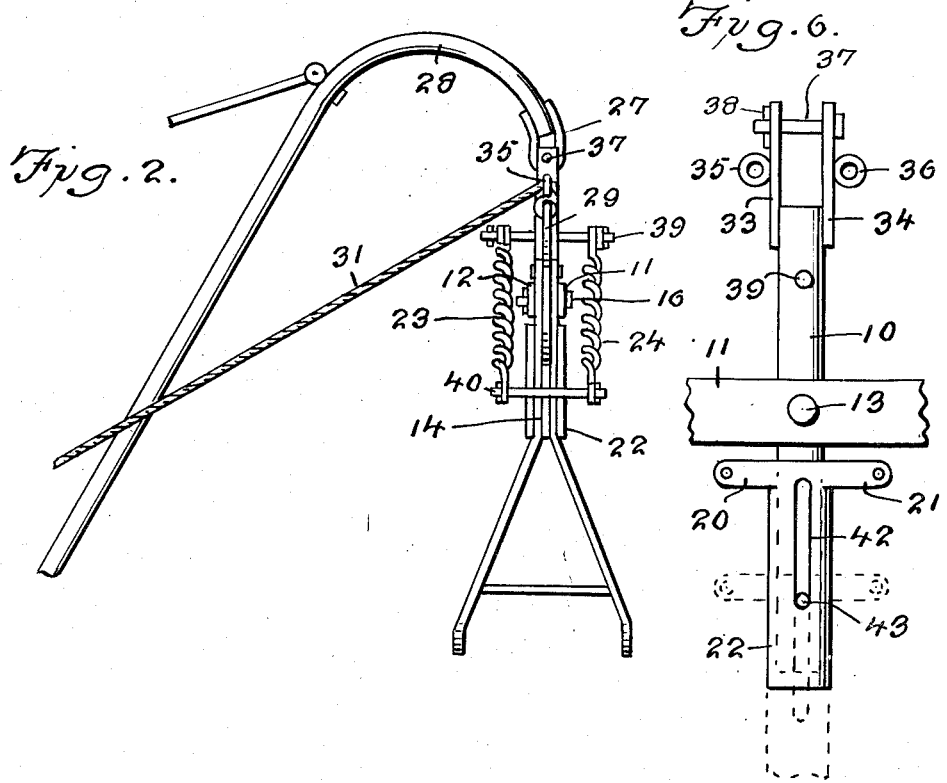
INVENTOR.
Paul E. Kunkel
BY Victor J. Evans & Co.
ATTORNEYS

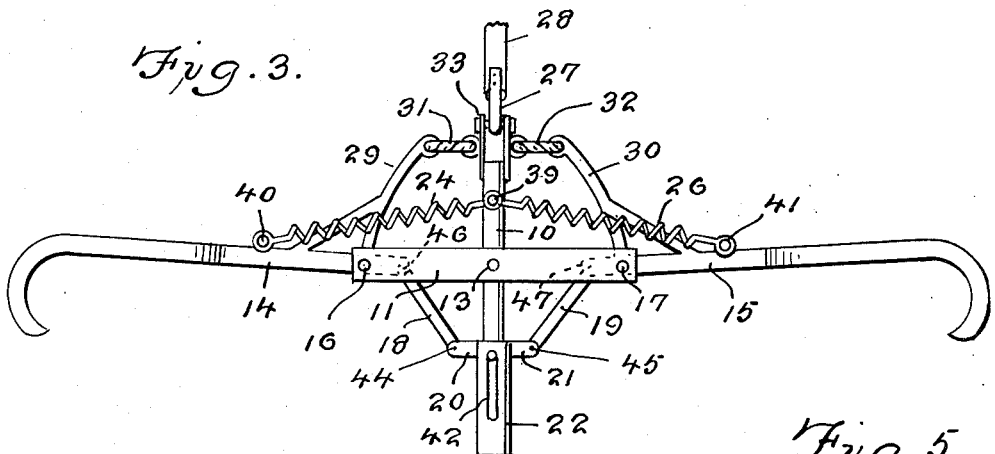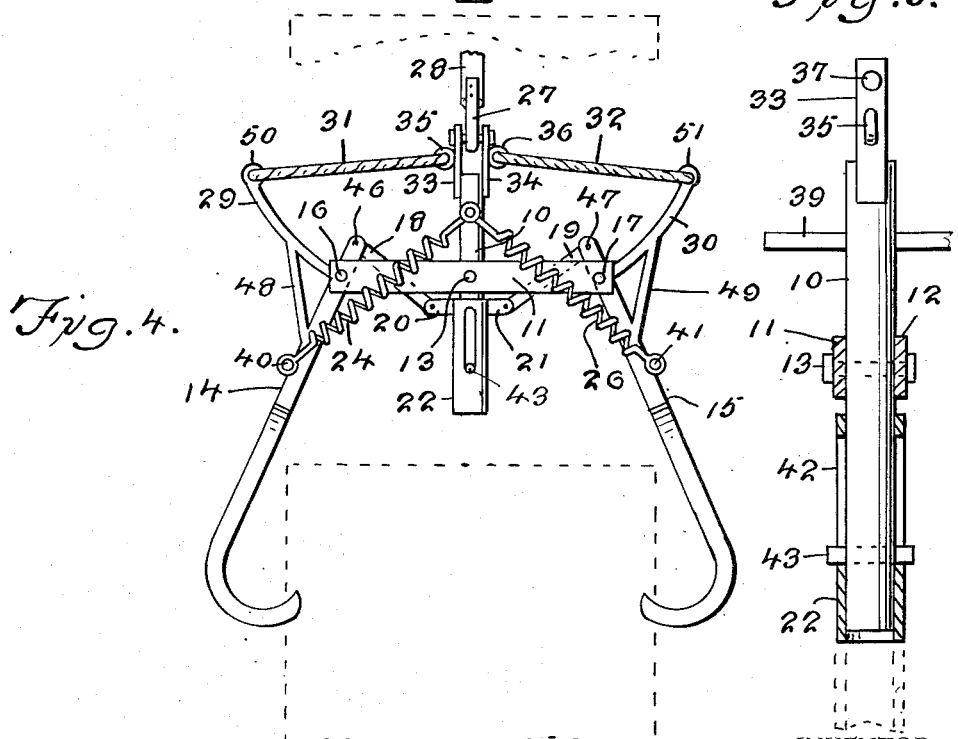

United States Patent Office 2,757,953
Patented Aug. 7, 1956

2,757,953

BALE GRAPPLE

Paul Edward Kunkel, Priddy, Tex.

Application December 23, 1953, Serial No. 400,022

2 Claims. (Cl. 294—110)

This invention relates to hay and bale loading equipment, and in particular a grapple fork having spaced prongs pivotally mounted in the ends of cross beams with inner ends of the prongs pivotally connected with links to a trigger slidably mounted on a stem extended through the beams and with the prongs, which are provided with upwardly extended arms to which cables are connected resiliently held in upwardly extended open positions and also in downwardly disposed gripping positions with springs connected to the stem and also to the prongs, the springs being positioned to pass over the centers of the pivotal mountings of the prongs.

The purpose of this invention is to provide a grapple form, particularly adapted for loading bales of cotton in which the fork is adapted to be opened and closed by an operator on a loader from the end of a boom by which the grapple fork is suspended.

Various types of grapple forks have been used for picking up hay and other products, however, with the conventional forks of this type it is necessary to use a hoisting cable and also both opening and closing cables and with forks of this type it is necessary to use three operators with one on the loader and one at each side of the fork. With this thought in mind this invention contemplates a grappling fork in which the tines or prongs are actuated to both released and gripping positions with toggle acting springs whereby it is only necessary to move the prongs comparatively short distances with the springs passing over the center of the pivotal mounting whereby the same springs snap the prongs into both gripping and releasing positions.

The object of this invention is, therefore, to provide improved mounting and operating means of prongs of a grapple fork whereby the fork is adapted to be actuated with a single operator.

Another object of the invention is to provide an improved grapple fork that is adapted to grip comparatively large bales, such as bales of cotton and that is also adapted to grip bales of hay and other products.

A further object of the invention is to provide an improved grapple fork which is of a simple and economical construction.

With these and other objects and advantages in view the invention embodies a grapple fork having a stem with a clevis at the upper end by which it is adapted to be mounted on a boom and a trigger on the lower end that is connected by links to prongs pivotally mounted in a cross bar positioned on the stem in which the prongs are actuated with springs positioned to pass over centers of pivotal mounting points thereof and also by cables attached to arms extended upwardly therefrom.

Other features and advantages of the invention will appear from the following description taken in connection with the drawings, wherein:

Figure 1 is a plan view of the improved grapple fork.

Figure 2 is a side elevational view showing the improved grapple fork suspended from the end of a boom.

Figure 3 is a front elevational view of the improved grapple fork showing the prongs in extended positions.

Figure 4 is a similar view showing the prongs collapsed to gripping positions with a bale or the like shown therein in broken lines.

Figure 5 is a vertical section through the fork, with the parts shown on an enlarged scale, showing the stem with mounting means at the upper end in elevation and showing the cross bars and trigger in section.

Figure 6 is a detail also with the parts shown on an enlarged scale showing a front elevational view of the stem and parts associated therewith and with parts omitted and other parts broken away.

Referring now to the drawings wherein like reference characters denote corresponding parts the improved grapple fork of this invention includes a stem 10 having cross bars 11 and 12 secured thereto with a bolt 13, double point prongs 14 and 15 pivotally mounted with pins 16 and 17, respectively in the ends of the cross bars 11 and 12 and connected with links 18 and 19 to arms 20 and 21 of a sleeve 22 providing a trigger, springs 23 and 24 on one side for actuating the prongs 14 and springs 25 and 26 on the opposite side for actuating the prong 15, a clevis 27 for attaching the upper end of the stem to a boom 28 and arms 29 and 30 extended upwardly from the prongs 14 and 15 and connected to the ends of cables 31 and 32 respectively.

The upper end of the stem 10 is provided with bars 33 and 34 having eyes 35 and 36, respectively thereon and the bars are connected to the clevis 27 with a bolt 37 which extends through the upper ends of the bars and which is held in position with a key 38. The upper part of the stem is also provided with a rod 39 to which the upper ends of the springs are connected and, as illustrated in Fig. 1, the opposite ends of the springs are connected to bars 40 and 41 on the prongs 14 and 15, respectively.

The sleeve 22 which provides a trigger is slidably mounted on the stem 10 and, as illustrated in Fig. 6 the sleeve is provided with elongated slots 42 that are positioned to receive the ends of a pin 43 extended through the stem.

As illustrated in Fig. 3 the links 18 and 19 are pivotally connected to the ends of the arms 20 and 21 with pins 44 and 45, respectively, and the opposite ends of the links are connected with pins 46 and 47 to extended ends of the prongs 14 and 15.

The arms 29 and 30, which extend upwardly from the prongs 14 and 15 are integral with the prongs and, as shown in Figs. 3 and 4 these arms are supported with braces 48 and 49, respectively. The extended ends of the arms 29 and 30 are provided with eyes 50 and 51 to which the cables 31 and 32 are connected, and, as illustrated in Figs. 2 and 4 cables extend through the eyes 35 and 36 on the bars 33 and 34 and from the eyes 35 and 36 to the loader where they are connected to suitable means for operating the cables to open and close the prongs.

The prong 14 is provided with spaced hook-like points 52 and 53 and the prong 15 is provided with similar points as indicated by the numerals 54 and 55.

With the parts assembled in this manner the springs snap the prongs from one position to another with the springs passing over the centers of the pivotal mounting pins 16 and 17 whereby with the prongs in the position shown in Fig. 3 it is only necessary to press upwardly on the sleeve or trigger 22 until the springs pass over the center at which time the springs will snap the prongs to the position shown in Fig. 4.

By this means the prongs may also be actuated from the position shown in Fig. 4 to the position illustrated in Fig. 3 by drawing on the cables 31 and 32.

It will be understood that although the grapple fork of this invention is particularly disclosed as being adapted for bales of cotton, it may also be used for bales of hay or for loose hay or other products.

It will be understood that modifications, within the scope of the appended claims, may be made in the design and arrangement of the parts without departing from the spirit of the invention.

What is claimed is:

1. A grapple fork comprising a vertically disposed stem, a cross bar carried by said stem, gripping prongs pivotally mounted in the ends of said cross bar, off center springs attached to the stem and prongs, said springs being positioned to snap over the center of the pivotal mounting of the prongs and being adapted to retain the prongs, selectively, in released and gripping positions, a trigger slidably mounted on the stem, links operatively connecting said trigger to said prongs whereby upon movement of said trigger to actuate said springs said springs will cause said prongs to close, and means limiting the travel of said trigger on the stem, said prongs having arms extended therefrom providing means for connecting operating cables thereto.

2. In a grapple fork, the combination which comprises a vertically disposed stem, means on the upper end of the stem for connecting the stem to supporting means, spaced cross bars carried by said stem, gripping prongs pivotally mounted in the ends of the cross bars and positioned between said bars, springs attached to the stem at a point spaced above the cross bars and connected to the prongs at points spaced outwardly of the pivotal mounting thereof whereby the springs are positioned to snap over the center of said pivotal mountings of the prongs for retaining the prongs, selectively, in upwardly extended released positions and in downwardly disposed gripping positions, a sleeve providing a trigger slidably mounted on said stem, links pivotally connecting the sleeve to the prongs, and means limiting the movement of the sleeve on the stem, said prongs having arms with eyes in the extended ends extended upwardly therefrom, said arms of the prongs providing means for connecting cables to the prongs.

References Cited in the file of this patent

UNITED STATES PATENTS

| | | |
|---|---|---|
| 409,478 | Lucky | Aug. 20, 1889 |
| 528,865 | Deschler | Nov. 6, 1894 |
| 1,039,737 | Hester | Oct. 1, 1912 |
| 1,534,954 | Holtz | Apr. 21, 1925 |
| 1,578,711 | Churchill | Mar. 30, 1926 |
| 2,227,793 | O'Keefe | Jan. 7, 1941 |
| 2,527,133 | Johnson et al. | Oct. 24, 1950 |